Dec. 25, 1962    D. J. BRICKLE    3,069,953
APPARATUS FOR V-SLITTING A MOVING WEB TO PRODUCE MULCHING STRIP
Filed May 4, 1960    2 Sheets-Sheet 1

DONALD J. BRICKLE
*INVENTOR.*

BY E. J. Berry

Dec. 25, 1962     D. J. BRICKLE     3,069,953
APPARATUS FOR V-SLITTING A MOVING WEB TO PRODUCE MULCHING STRIP
Filed May 4, 1960     2 Sheets-Sheet 2

DONALD J. BRICKLE
INVENTOR.

BY

United States Patent Office 3,069,953
Patented Dec. 25, 1962

3,069,953
APPARATUS FOR V-SLITTING A MOVING WEB TO PRODUCE MULCHING STRIP
Donald J. Brickle, Clifton Springs, N.Y., assignor to National Distillers and Chemical Corporation, New York, N.Y., a corporation of Virginia
Filed May 4, 1960, Ser. No. 26,818
7 Claims. (Cl. 83—418)

The present invention relates to an apparatus for forming mulching strips employed in agriculture and horticulture for the purpose of restraining weed growth, and for the conservation of soil moisture. More particularly, the invention relates to a means for V-notch slitting of sheeted materials intended for use as a mulching strip, whereby to provide access of rain water and surface condensation to soil surfaces covered by such strips. Additionally the invention relates to such mulching strips as an article of manufacture.

In the cultivation of plant life for the production of floriferous and/or vegetable crops, it has been customary to provide a ground cover between and around the rows of plants being cultivated in order to hamper access and germination of undesired weed growth in the vicinity of the wanted vegetation, and also for the purpose of restricting loss of ground moisture by evaporation. This protective cover is generally known as mulch and it may be accomplished by spreading moisture retaining, substantially inert materials over the soil surface. Such materials have included dead leafy vegetation, straw, hay, and the like. Being largely vegetative, while affording easy access of rainwater and condensed atmospheric moisture to the soil, these materials have offered problems of displacement, weed carrying, and decay.

To overcome such problems, treated paper and cloth-like materials have found considerable favor in the service contemplated. These materials have largely eliminated the problems of displacement, decay, and soil contamination experienced in the use of vegetative mulches, but have introduced problems of their own.

The treated paper and cloth-like materials are frequently quite impervious to moisture. While thus being excellent for moisture retention, they have automatically prevented proper and essential access of atmospheric moisture to the soil covered by them. Accordingly, where these materials are employed, it has been customary for the user to punch holes through the mulching cover at random intervals to provide moisture access. This, of course, not only reduces the moisture retaining efficiency of the cover, but also provides access for weed seeds, and for the growth of the undesired vegetation therefrom.

In view of the common practice of perforating the protective cover materials in situ, and after application, many manufacturers of the cover materials have undertaken to supply pre-punched strips. In an effort to avoid the undesirable characteristics of a strip having clearly defined perforations, such mulching strips have been supplied with small slits extending longitudinally or transversely of the strip material. Such expedients have not been entirely satisfactory, however. The longitudinal extending slits so formed tend to be held in a relatively closed condition under the tension set up by the weight of the material, or similarly separated when disposed in a lateral direction.

It is an object of the present invention to provide, as an article of manufacture, a mulching strip of a sheet material containing a plurality of formed openings for the access of atmospheric moisture, wherein said openings are substantially self closing through the medium of flap-like closures integral with the sheet material, and wherein such closure flaps readily react to the weight of water in the form of rain drops, beads of condensed moisture, and the like to pass such water through the strip, while at other times resiliently acting substantially to close the openings. Another object of the invention is to provide a means for producing mulching strips or sheets of the character contemplated in a machine having a minimum of moving parts. A still further object of the invention is to provide a means for forming a plurality of V-shaped slits in a sheet of mulch material, wherein the area of the material contained within the V slit is a generally triangular closure for a generally triangular opening defined by the angled edges of the slit, and wherein such closure flap is hinged substantially along the base of the triangular area between the ends of the sides of the angular opening formed.

The invention and its objects may be more clearly understood from the following specification when it is read with reference to the accompanying drawings wherein.

Figure 1:
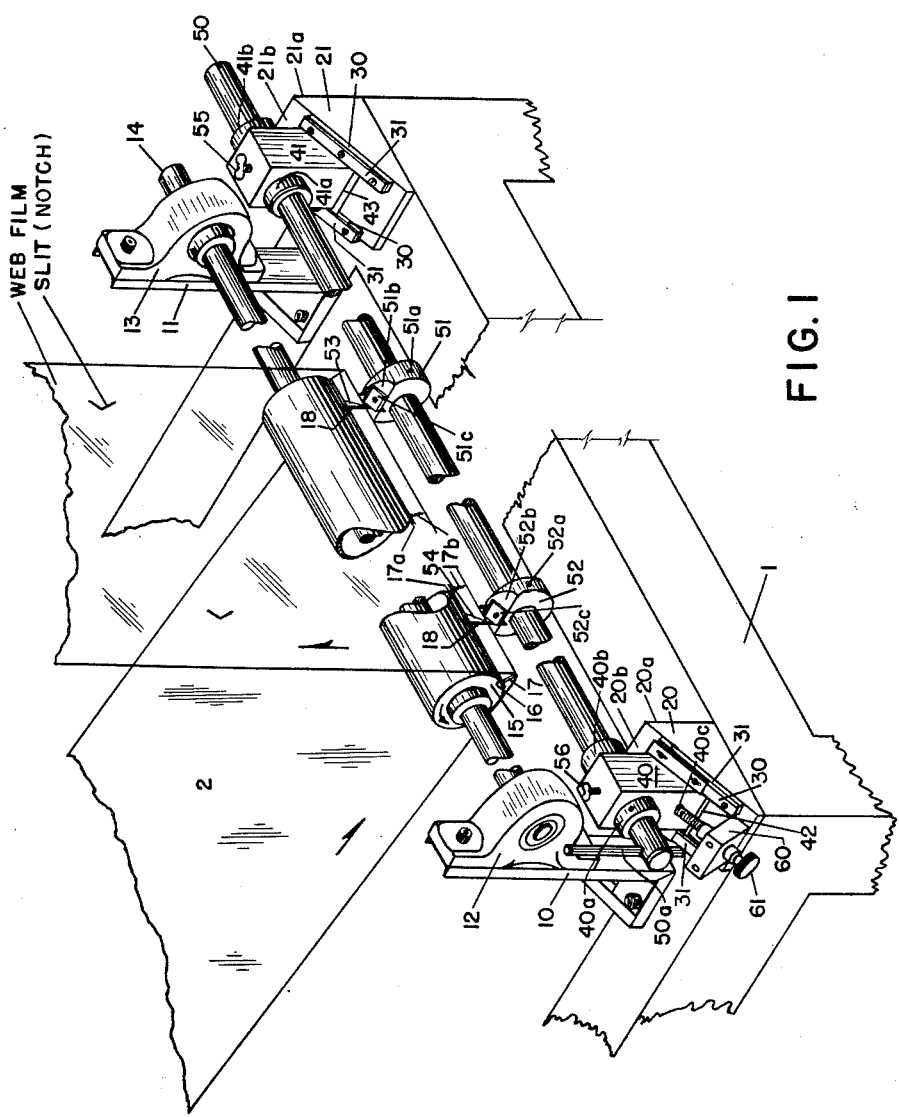
FIG. 1 is a perspective view of an apparatus portion according to the present invention.

In the drawings, the numeral 1 designates a support frame or mount for the apparatus contemplated. This frame may be an extension of any conventional mount adapted to carry a wound roll of the strip material to be processed, or of a continuous supply source for such film material. The wound roll or other such source of material is not shown, but in the drawing, the film strip or web drawn therefrom is designated by the numeral 2.

Mounted on the top of frame 1, and in oppositely disposed aligned relation are a pair of upstanding bearing support standards 10 and 11, each of which carries a pillow block bearing, respectively designated by the numerals 12 and 13. These bearing members are disposed in opposed aligned relation to receive opposite ends of a shaft 14 on which is mounted a metal roll 15 disposed intermediate the shaft ends and the bearing members.

The surface of the roll 15 is sectioned chordally so as to provide a flattened portion 16 extending longitudinally of the roll for its entire length. The flattened portion 16 provides a mounting surface for a radially extended T-bar 17. The cross arms of the T provide a flanged mounting base 17a for the bar, with the vertical arm 17b extended outwardly therefrom. As shown, the arm 17b is rounded at its outermost end and polished to a smooth, snag-less surface condition. Also at intervals along its length, the bar is cut from side to side to define a series of parallel, angular slots, designated by the numeral 18. The bar 17 may be secured to the roll flattened portion in any conventional fashion, not shown, such as by welding, or by means of screws or the like.

Beyond the respective standards 10 and 11, in the direction of travel of a film web therebetween, are disposed a pair of mounting blocks 20 and 21. Each block is of generally right-triangular configuration and mounted in aligned relation on opposite sides of the frame 1. These blocks are also disposed so that the intersecting vertical and the inclined side surfaces are in parallel relation. The numerals 20a and 21a designate the respective vertical side surfaces, while the numerals 20b and 21b designate the inclined side surfaces of the blocks.

On the inclined side surfaces of each block are mounted a pair of opposed channel members. As shown, these elements consist of a base plate 30, and a cover plate 31, the cover plates having a greater lateral dimension than the base plate, and disposed so as to extend over the inner side edge portion of each base plate and toward each other. As so disposed, a channel is defined between the cover plate and the inclined block surface, the opposite channels opening toward each other, and having a bottom wall formed by a base plate element. If desired the base and cover plate elements may be combined as an integral unit having a flange like extension portion along one side edge formed by rabbetting the base plate element.

Disposed on the inclined surface of each of the mounting blocks 20 and 21 is a bearing block, the respective blocks being designated by the numerals 40 and 41. Each said block has an angular base portion substantially matched to the angle of inclination of the mounting blocks. The bearing blocks are adapted to fit between the respective cover plate elements 31 on each block. Between each bearing and mounting block is disposed a slide plate such as designated by the numerals 42 and 43, these plates being secured to the under, inclined bottom surfaces of the bearing blocks as by flat headed screw bolts, not shown. Each of the plates 42 and 43 has a lateral dimension substantially equal to the distance laterally between the inner side edges of the base plates 30 when the latter plates are mounted in the manner shown, each plate is mounted on the bottom of a bearing block so as to extend to an equal distance on either side of the block, whereby to be slideably engageable in the channels defined by the base and cover plates at each side of a mounting block inclined surface.

The bearing blocks 40 and 41 serve to support cross frame shaft 50, which in turn provides a mount for a series of knife blade holders such as designated by the numerals 51 and 52. Each holder is a circular collar fitted on the shaft 50, and fixed thereon as by means such as set screws 51a and 52a. Each holder further includes an inclined edge surface portion disposed in a plane angularly related to the longitudinal axis of the shaft 50, and to a plane intersecting said axis in right angular relation thereto. Preferably the inclined surface portion of each holder edge is inclined at the same angle to the shaft axis, and is in parallel relation to the other. The inclined surface of the holder 51 is designated by the numeral 51b and that of the holder 52 by the numeral 52b. Also, the angle of the inclined surface portions 51b and 52b are specifically matched with the angle of the slots 18 in the bar member 17, or vice versa. The numerals 51c and 52c respectively designate knife clamps adapted to retain knife blades 53 and 54 in position on the holders 51 and 52, the clamps being held in engagement with the blades in any conventional fashion, such as by means of the cap screws illustrated.

Figure 2:
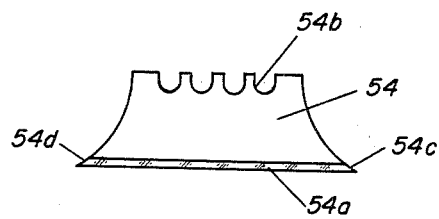
FIG. 2 is a view in side elevation of a knife blade such as employed in the apparatus of FIG. 1.

As shown in FIG. 2, the blade 54 is a straight edged element having a cutting edge 54a formed, as by grinding, along one longitudinal side. The other edge of the element preferably is notched, as at 54b to receive the shafts of a cap screw shown in FIG. 1. The opposite ends of the blade elements are shaped or formed so as to provide puncture points 54c and 54d coincident with each end of the cutting edge, whereby the blade is made reversible. Preferably shaping is accomplished by accurate conformation of the blade ends to the conformation of the idler roll surface. In any event, the angle formed between the cutting edge of the blade and the end edge thereof should be substantially less than 90° in order that a well defined puncture point be formed, and should be determined substantially according to the formula subsequently set forth herein.

Setting and adjustment of blade extension beyond the clamps 51c and 52c as well as the angle of inclination of the respective knife blades in a plane common to the web to be processed may be accomplished by suitable positioning of the blades as held by the clamps. In addition, adjustment of the blade angle with reference to the work plane may be accomplished by rotation of the shaft 50.

The shaft 50 is held in the bearing blocks 40 and 41 against movement laterally of the frame as by means of paired collars 40a, 40b, 41a, and 41b. As shown, in each pair, one collar is disposed on one side of a bearing block, and the other on the other side. Means, such as set screws, are provided to maintain the collars on the shaft in set position against the bearing block surfaces. The shaft may be held against undetermined rotation in the bearing blocks 40 and 41, by means such as thumb screws 55 and 56, threaded through suitable passageways in the upper ends of the respective blocks to engage the shaft. A handle 50a at one end of the shaft 50 provides means for rotating the shaft, when the thumb screw engagement with the shaft is released.

Adjustment of the shaft position, laterally of the frame 1 is provided by an adjusting mechanism including adjusting block 60, and adjusting screw 61. The block 60 is rigidly mounted adjacent the lower end of the inclined surface 20b of block 20. The screw 61 extends through a passage in the block 60, perpendicular thereto, and is held against longitudinal movement in the passage by means of collar elements fixed to the screw shaft on either side of the block. The block, having a flat base, when it is fixed to the inclined surface 20b, holds the screw shaft in parallel relation to the inclined surface.

The end of the adjusting screw 61 extended over the surface 20b is threaded for engagement in a threaded bore drilled in the bearing block 40. The opening of the bore is indicated by the numeral 40c, the bore extending therefrom into the block at an angle, and in parallel relation to its base and the surface 20b. Rotation of the screw 61 will move the block 40 up or down over the surface 20b, depending upon the direction of rotation. Of course, such movement will raise or lower the shaft 50, the block 41 following such movement on the surface 21b. The means for raising and lowering the shaft and for rotating the shaft provide for fine adjustment of the knife of the blades with reference to the film web planes, and to the slots 18 in the T-bar 17.

In operation, a T-bar having any desired number of slotted portions 18 defined therein is affixed to the roll 15. Knife blades and collars such as 53 and 51, and 54 and 52, are positioned and secured to the shaft 50. By suitable location of the collars, and by suitable adjustment of the clamps 51c and 52c, the blades are brought into substantially such position as to permit them to pass through the slots 18 when the roll 15 is rotated. Fine adjustment and positioning is accomplished by rotation of the shaft 50, and by height adjustment of the shaft by means of the screw 61.

When thus positioned, the shaft 50 is then rotated to move the blades outwardly and away from the T-bar. With the blades thus withdrawn from an operating position, a film web is passed under the roller 15, in a second plane substantially at right angles to said first plane, the film web being introduced into said first plane from any suitable source of supply, and withdrawn through said second plane as by a roll winding means. Movement of the film web through the first and second travel planes is established primarily by operation of the means provided for withdrawal of the film over the roll. With the film web held tightly against the roller 15, movement of the film causes it to rotate, the bar 17 extending the film at substantially the juncture of the two travel planes, once each revolution of the roller.

Movement of the film having been established in the manner described, the shaft 50 is rotated so as to move the knives toward the roll 15, and to reestablish the originally adjusted relationship of the knives to the slots 18. As this is done, and when accomplished, the extreme end edge, or puncture point of the knives will penetrate through the film web as the T-bar 17 extends the web into contact therewith. From points of contact in advance of the T-bar and above it the film web will be sliced along lines extending to the outer end of the T-bar at an angle to the first travel plane. Then, as the inner edge portions of the blades pass through the slots in the T-bar the film web will be sliced from the outer end of the T-bar along lines extending to a point in the line of travel which is spaced from the initial point of contact by a distance substantially as indicated by the "hinge line" formula shown below.

The various characteristics of the notches and triangular flaps formed by notching, as well as of physical relationships of the roll, T-bar slots, and the knives may be determined from the following formulas wherein:

$\underline{/A}$ = the notch angle.

$r$ = the roll radius.

Figure 3:
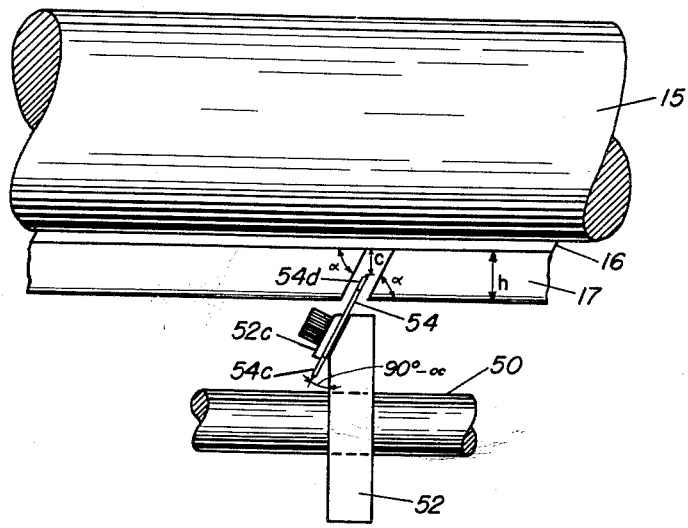
FIG. 3 is an enlarged view from above of a knife blade and holder as mounted in operating position, also showing a portion of the holder mounting shaft and of the slotted film roll extension bar according to FIG. 1.

$h$ = the T-bar height or extension above the roll surface. (See FIG. 3.)

$C$ = minimum vertical clearance between the knife puncture point and inner end of T-bar slot. (See FIG. 3.)

$\alpha$ = acute angles formed between sides of the T-bar slots and the roll surface, and by the corresponding angular relationship of the knife blade to its parallel support axis. (See FIG. 3.)

$X$ = ½ the hinge length of a triangular notch flap.

$S$ = the length of one of the notch sides.

$D$ = the center line distance between notches.

For example, the apex angle of the notch and of the triangular flap may be determined according to the formula $$\underline{/A} = \frac{2 \arctan \left[ (r+C)(r+h) \sin \left( \arcsin \frac{r}{r+h} + \arcsin \frac{r}{r+C} \right) \right]}{r(h-C) \cot \alpha}$$

This formula may also be employed to establish the fact that as "$r$" and/or "$h$" are increased or decreased the notch angle "$\underline{/A}$" will change in corresponding fashion. Also, from this formula it becomes evident that a change in notch angle is also directly related to any change in the value of the angle "$\alpha$."

On the other hand, the length of the respective sides of the $\underline{/A}$ is governed according to the formula:

$$S = \sqrt{(r+C)^2 (r+h)^2 \left( \arctan \left[ \sin \left( \arcsin \frac{r}{r+h} + \arcsin \frac{r}{r+C} \right) \right] \right)^2 + (h-C)^2 \cot \alpha^2}$$

The angular slots or cuts formed in the web material by the blades will define between them a triangular flap of the web material joined to the main body along a "hinge line" extending between the divergent ends of the slots, and substantially parallel to the side edge portions of the web. This hinge line is substantially coincident with the base line of the triangular flap. The length of this hinge line is determinable from the following formula:

$$2X = \frac{2(r+C)(r+h) \sin \left( \arcsin \frac{r}{r+h} + \arcsin \frac{r}{r+C} \right)}{r}$$

To determine the height of T-bar extension 17 beyond the roll surface required to obtain a notch and flap having certain desired characteristics, one of the following formulas may be employed:

(a) $$h = \frac{x}{\cot \alpha \tan \frac{\underline{/A}}{2}} + C$$

(b) $$h = C + \sqrt{\frac{S^2 + X^2}{\cot^2 \alpha}}$$

In order to determine a conformation of the knife blade ends such as required to avoid contact thereof with the roll surface while establishing a predetermined value for "$C$," the angle formed between the web, extended on contact with the outer end of the T-bar and in tangency to the roll surface, and the cutting edge of the blade at its initial puncture point must be established. This is done by first establishing a value for the angle "$\beta$" formed between the T-bar and the web, under the given conditions, according to the formula $$\sin \beta = \frac{r}{r+h}$$

With this value established the end of the knife blade is given a conformation described by an arc having a radius equal to "$r+c$," and with a center of radius on a line extended through an end of the cutting edge to form an angle with an extension thereof which is as close to $2\beta - 90°$ as possible. Then rotating said radius "$r+c$" on said center, to intersect the knife blade end between the opposite longitudinal edges thereof, provides a conformation line which will afford clearance between blade and roll while permitting establishment of the desired value for "$C$," when said knife blade is positioned on its holder so as to initially puncture the web at an angle not equal to or greater than the angle $2\beta$.

Longitudinal, center to center spacing of successive notches is determined according to the following formula:

$$D = \frac{r\pi \left( 90° - \arcsin \frac{r}{r+h} \right)^{+2} \sqrt{2rh + h^2}}{90°}$$

As should be evident, the value of D will increase and decrease in direct relation to any increase or decrease of the dimension of either or both "$r$" and "$h$." Spacing of the notches may also be decreased by increasing the number of T-bars 17 as applied to the surface of the roller 15.

In the operation described, it is essential that initial penetration of the web be accomplished with the web in tangential relation to the idler roll, and also that during the notching operation the web have tangential contact with the roll in one plane or the other at all times. To insure this contact suitable tension must be maintained on the web. Also, inasmuch as the T-bar tends to extend or stretch the film while in operating contact therewith, care must be exercised to avoid stretching of the web beyond its elastic limit, beyond which permanent deformation may take place.

When employing thermoplastic materials of the character and in the manner contemplated, a suitable tension value may be established by regulating the unwinding and rewinding rates, as well as by the use of dancer rolls or bars well known in the art.

The increased tension introduced by reason of the use of the T-bar web extender 17, normally can be accommodated in the web material between the point of T-bar contact along a line vertically through the idler roll center, and a similar line through a point spaced from the idler roll center by at least a dimension calculated according to the following formula:

$$Y'' - 100 \sqrt{2rh + h^2} - \frac{50\pi r \left( 90° - \arcsin \frac{r}{r+h} \right)}{90°}$$

Where Y is the critical dimension, as is evident, this critical distance varies in direction relation to the values which may be given to "$r$" and "$h$."

If for any reason, the distance "$Y$" required according to values applied to $r$ and $h$ cannot be attained, dancer bars advisably should be introduced between the supply source and the idler roll, in order to avoid extension of the web material beyond its elastic limit.

Although the invention is particularly concerned with the manufacture of a mulching strip of the character described, using a thermoplastic material for that purpose, neither the concept nor the product is to be considered as thus limited. Impregnated paper and cloth-like materials may be processed in the manner contemplated with comparative success. A preferred thermoplastic strip material, however, is one having a gauge thickness in the range of from about .2 to about 15 mils.

What is claimed is:

1. An apparatus of the character described, comprising a rotatable idler roll disposed for transverse relation to a strip of a sheet material movable thereover, said roller being adapted for rotation by said strip; at least one T-bar element secured to the surface of said roll in parallel relation to the longitudinal axis of said roll, said element having a portion extending radially from said roller surface; at least one slot portion defined in said T-bar element radially extended portion in angular relation to the axis of said roller; at least one knife blade supported in spaced relation to said roller to extend angularly there-toward in aligned passable relation through said corresponding T-bar slot portion.

2. An apparatus of the character described comprising a rotatable idler roll disposed for transverse relation to a strip of a sheet material movable thereover through two planes substantially in right angular relation tangential to said roll surface; at least one T-bar element mounted on said roll surface, including a leg portion extended radially from said surface; at least one slot defined in said leg portion in angular relation to said roll surface, intermediate the ends thereof; a carrier shaft disposed in spaced, axially parallel relation to said roll; at least one knife blade holder supported on said shaft, and a knife blade mounted thereon in substantially equi-angular relation to said shaft and roll axes, said blade disposed for passage through said T-bar slotted portion as said T-bar rotates with said roll; means for adjustable elevation and depression of said carrier shaft relative to said roll axis; and means for rotating said carrier shaft.

3. An apparatus according to claim 2, wherein said means for elevating and depressing said carrier shaft comprises a pair of triangular mounting blocks disposed in opposite aligned relation with at least a vertical and an angular surface thereof in parallel relation from block to block; a bearing block at each end of said carrier shaft, means for retaining said bearing blocks in reciprocally slideable relation to said respective mounting block inclined surface portions; a rotatable screw thread bolt means supported on one said mounting block at the lower end of said mounting block inclined surface to extend angularly upward in parallel relation to said surface and into threaded engagement with said bearing block; and means for retaining said carrier shaft in fixed relation to said respective bearing blocks.

4. An apparatus according to claim 3, wherein said means for retaining said shaft in fixed relation to said bearing blocks comprises, two pairs of collar members, each pair disposed on said shaft in opposed relation on opposite sides of one of said bearing blocks and in fixed relation to said shaft whereby said shaft is retained against movement in said blocks along the axis of said shaft; and at least one threaded friction means in at least one bearing block adapted to engage said shaft against rotation in said block.

5. An apparatus according to claim 3, wherein said means for retaining each said bearing block comprises a pair of channel guides disposed in coextensive relation along opposite inclined edges of said mounting block inclined surface portions, said guides defining oppositely opening recesses with said surface portions, and a flange-like extension along opposite side edge portions of each said bearing block, and at the bottom thereof, adapted to be received in said respective recesses.

6. An apparatus according to claim 5, wherein said flange-like extension is formed by means of a slide plate having a lateral dimension greater than that of said bearing block, secured to the bottom of said block.

7. An apparatus according to claim 5, wherein each said channel guide comprises a base plate element coextensive with the edge portions of said bearing block inclined surface portion in aligned edge relation to said block and a cover plate superimposed upon said base plate to extend inwardly toward the center line of said inclined surface portion, said base and cover plates being secured to each other and to said inclined surface portion.

References Cited in the file of this patent

UNITED STATES PATENTS

| | | |
|---|---|---|
| Re. 6,315 | Eachus | Mar. 2, 1875 |
| 148,164 | Bart | Mar. 3, 1874 |
| 793,051 | Chapman | June 27, 1905 |
| 923,198 | McIntyre | June 1, 1909 |
| 1,396,269 | Eckart | Nov. 8, 1921 |
| 1,553,035 | Eckart | Sept. 8, 1925 |
| 1,659,715 | Baker | Feb. 21, 1928 |